M. J. KLEIN.
SIDE FORCE AND DANGER INDICATOR.
APPLICATION FILED APR. 24, 1914. RENEWED MAR. 22, 1918.

1,309,574.

Patented July 8, 1919.
3 SHEETS—SHEET 2.

Inventor:
Mathias J. Klein

UNITED STATES PATENT OFFICE.

MATHIAS J. KLEIN, OF NEW YORK, N. Y., ASSIGNOR OF SIXTY ONE-HUNDREDTHS TO HUGO B. ROELKER, OF NEW YORK, N. Y.

SIDE-FORCE AND DANGER INDICATOR.

1,309,574.      Specification of Letters Patent.      Patented July 8, 1919.

Application filed April 24, 1914, Serial No. 834,114. Renewed March 22, 1918. Serial No. 224,051.

*To all whom it may concern:*

Be it known that I, MATHIAS J. KLEIN, a citizen of the United States of America, residing in New York, borough of Manhattan, in the county and State of New York, have invented certain new and useful Improvements in Side-Force and Danger Indicators, of which the following is a specification.

This invention relates to indicators to be used on motor vehicles, automobiles and other vehicles, having three or more road wheels, its object being to show in the first place, the danger of the vehicle being turned over when the latter is moving in a curve at a more or less high speed, and, secondly, to show the so-called "side-force" acting sidewise on the vehicle to the right or to the left.

The object of the invention is, therefore, the same as in my former application, side-force and danger indicators, Serial Number 571,368, filed July 11, 1910; in the latter application, a pendulum oscillating in a casing is used, and its oscillations are transmitted to an index-hand moving over a dial, or said index-hand may be connected directly to the pendulum. In the present application there are besides the oscillating pendulum, also equivalent arrangements used; first, a curved glass tube in which a ball is rolling or oscillating surrounded by a liquid of greater or less density than said ball. Said curved glass tube, the curvature of which may be of any kind, (circular, elliptic, parabolic, etc.), is connected to a base-plate having a dial, and said rolling ball acts as an index-hand; secondly, a curved or bent glass tube connected to a base-plate with a dial, in which an oscillating liquid is used, and the level of said oscillating liquid acts as an index-hand. On each of said dials of the different arrangements, there are always two so-called "danger-marks" (or "danger-hands" or "danger-points", or "turn over marks"), which have fixed or variable places on the dial, according to the load of the vehicle, or more correctly, according to the position of the center of gravity of the loaded or unloaded vehicle; said position of the center of gravity may be the same for different loads of the vehicle, but usually it is not. Said dial may be without any scale, and having only the two danger-marks and the zero point, but usually it has one or more pairs of variable or non-variable (constant) scales, on which the index-hand of the indicator shows the side-force acting on the vehicle for right and left hand turns of the latter, in a direct or indirect way. When either of said two danger-marks or danger-hands is reached by said index-hand, the vehicle is turned over by said side-force. If, therefore, (vehicle moving in any curve on a level or banked road), the index-hand comes more or less near to one of said danger-marks or danger-hands, the vehicle is in more or less danger of being turned over. Such indicators with two danger marks on the dial, which act for right and left hand turns of the vehicle, are called in the following description "double acting indicators" (or "double acting side-force and danger indicators") in contrast to so-called "single acting indicators" (or "single acting side-force and danger indicators"), with only one danger-mark on the dial, and which act only for a right hand or for a left hand turn of the vehicle. If there are more than two danger-marks on the dial, two of them are only acting at a certain time, corresponding to a certain load of the vehicle.

In a straight moving four wheeled vehicle, the line described by the center of gravity of the (loaded or unloaded) vehicle, is the so-called "center line" of the vehicle, which may be midway or not midway between the side road-wheels of the vehicle. That horizontal line which crosses the center line normally in the center of gravity of the vehicle (the latter standing on a level road), is the so-called "side normal line" or "side normal" of the vehicle. As long as the center of gravity of the vehicle has the same position on the vehicle, or is only shifted forward or backward in the same center line, the two acting danger-marks have the same positions on the dial, but when the center line changes its position on the four wheeled vehicle according to different loads (full load, half load, no load), the two acting danger-marks change their positions on the dial of the indicator also. The side-force indicated by the instrument acts always on the center of gravity in the direction of said side-normal. If the vehicle moves in a curve, a centrifugal force acts also on the center of gravity of the vehicle; its direction may be in the direction of said side normal, but usually it is not. Said side-force is caused or produced by the weight of the vehicle, or by said centrifugal force, or by both; it is only a component of the resultant force (of vehicle weight and centrifugal force) acting on the center of gravity. The double acting indicator shows the side-force on its dial on a pair of so-called "side-force scales," directly in percentage of the turn over side-force (not its absolute value which is a variable quantity). The two acting danger-marks, (or danger-hands), on the dial of said double acting indicator represent always the 100% side-force (the turn over side-force); they are marked in the following by "100s" (meaning 100% side-force), but they may be marked in some other way. In my former application (above mentioned), the danger-marks are marked in the drawing with the number 100. If the dial of said double acting indicator is provided with a pair of scales, on one scale is shown, the side-force acting on the center of gravity of the vehicle to the left hand side (by a vehicle turn to the right), and on the other scale is shown the side-force acting in the opposite direction to the right hand side (by a vehicle turn to the left hand side); both scales have the same zero-point, and the same zero-line. If the vehicle is standing on a level road, said zero-line (with its zero-point), has a vertical position, when the "oscillating ball in tube form" is used for the indicator; if the "oscillating liquid in tube form" is used, said zero-line has a horizontal position; but when the "pendulum form" is used, said zero-line (with its zero-point) may have a vertical, a horizontal or any other position, according to indicator construction. If the index-hand is at the zero-point of said scale-pair, no side-force acts on the vehicle or center of gravity of the latter. Said scales on the dial may be side-force scales which are variable scales. They change with the position of the center line of the vehicle (or with the position of the danger-marks on the dial); if said center line is midway or not midway between the side road wheels of the vehicle, both scales of the scale-pair and their scale divisions are (in most cases, but not always) respectively equal or not equal. Instead of a pair of variable side-force scales, said scales on the dial may be a pair of non-variable or constant scales, for instance, "grade-scales" (as used on gradometers), or "degree-scales" (90 degrees are a right angle), etc.; a pair of non-variable scales would indicate the side-force acting on the vehicle also, but in an indirect way only. If (vehicle moving in a curve) the index-hand reaches the 50s mark of a side-force scale, a side-force of 50% or 50/100, that is 1/2 of the turn over side-force acts on the center of gravity of the vehicle in the direction of said side-normal; if said index-hand reaches 75s, 75/100 or 3/4 of the turn over side-force is shown, and by reaching one of the 100s marks (danger marks) by the index-hand, the vehicle turns over to the right hand side (by taking a left hand turn), or to the left hand side (by taking a right hand turn of the vehicle).

If the indicator of the four wheeled vehicle has its danger-marks for different vehicle loads at different places of the dial, it is advisable to have the dial of the indicator provided with a pair of variable side-force scales, or with a pair of non-variable scales, on which the two danger-marks (or danger hands) can be shifted according to the load of the vehicle, as will be shown more clearly in the following. If the dial of the double acting indicator has no scale-pair (but only the two danger-marks and the zero-point), then the turn over danger is shown as before, but the side-force can not be read off, it can only be roughly estimated, as the index-hand comes more or less near to one or the other of said danger-marks (or danger hands). Any kind of scales on the dial of the indicator shows the more or less high degree of danger for the vehicle to be turned over in scale-numbers, which increase from the zero-point up to the danger-marks.

The said double acting side-force and danger indicator must be mounted on the four wheeled vehicle (the latter standing on a level road) near to the center line in such a way, that the plane of the oscillating pendulum (or ball or liquid) is normal to said center line, and its index-hand points to the zero-point, otherwise its place on the vehicle is optional. It is placed usually on the dashboard of the vehicle in front of the vehicle driver, and shows, according to mechanical laws, the side-force (as described above) acting on a four wheeled vehicle (the latter moving in a curve), always correctly, whether the road is level or banked, whether the curve in which the vehicle moves has a horizontal or any other position, and whether the radius of the curve, and the vehicle speed, is large or small. In a three wheeled vehicle, it is different; a double acting indicator (using a pendulum or ball or liquid), would show the side-force acting on a three wheeled vehicle only nearly correctly; in order to show the side-force also always correctly on a three wheeled vehicle, a pair of single acting side-force and danger indicators have to be used.

The present application is limited to a double acting indicator having the form of a rolling oscillating ball in a curved glass tube, closed at the ends, and nearly filled up with a liquid specifically lighter than the ball, the object of the liquid (surrounding the ball) being to bring the oscillation of said ball quickly to rest. In the two applications "side-force and danger indicators," filed Dec. 28, 1914, Ser. No. 879,415, and May 24, 1915, Ser. No. 30,061, two pendulum forms are described and claimed. In a third application, filed July 11th, 1917, Serial No. 179,881, which is, in part, a division of the present application, I have described and claimed an arrangement of a bent or curved glass tube having an oscillating liquid therein.

In the accompanying drawing.

Fig. 4 shows the front views of the principal parts of five equivalent constructions of said indicator, which are using respectively; an oscillating pendulum an oscillating ball in a circular curved glass tube surrounded by a liquid specifically lighter or heavier than the ball, and an oscillating liquid level in straight or circular curved glass tubes; all five arrangements having the same oscillating axis and being shown as double acting indicators.

Figs. 7 to 12 show three double acting indicators, all of which use an oscillating or rolling ball in a curved glass tube filled with a liquid specifically lighter than the ball.

Figs. 7, 9 and 11 are front views, and

Figs. 8, 10 and 12 are vertical sections of the three indicators; the curvature of the glass tube is circular in Fig. 7, elliptic in Fig. 9, and parabolic in Fig. 11.

In each of the four indicators shown in the Figs. 5 to 12 the oscillating or rolling ball acts as an index-hand on the dial of the instrument.

Fig. 13 is a front view of a part of an indicator, using two oscillating balls as an index-hand.

The liquid used in the indictors should be a non-freezing liquid.

Similar letters of reference indicate corresponding parts in all figures.

Figure 1:
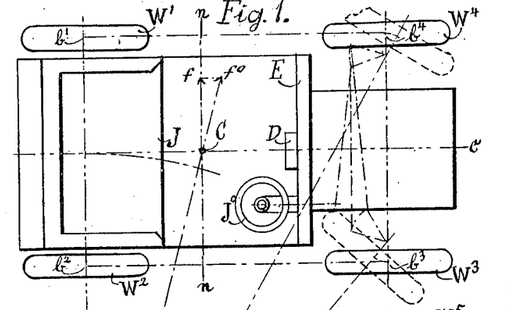
Figure 1 is a plan view of a four wheeled, and Fig. 3 a plan view of a three wheeled motor vehicle, each having on its dashboard a double acting side-force and danger indicator provided with my improvements.
Figure 2:
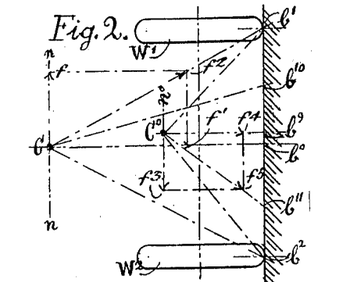
Fig. 2 shows a front view of the two driving wheels and the center of gravity only (of said four wheel vehicle, Fig. 1).

The four wheeled motor vehicle, Fig. 1, and the three wheeled vehicle, Fig. 3, have on their dash-boards E and $E^1$ the double acting side-force and danger-indicators D and $D^1$ respectively; each of them may have the construction of one of the several arrangements shown and described in the following. $W^1$ $W^2$ are the driving wheels and $W^3$ $W^4$ the steering wheels of the Fig. 1 vehicle; J is the seat for the driver, $J^0$ the steering wheel and C the center of gravity of the fully loaded vehicle; $Cc$ is the center line, $nCn$ the side normal, and $b^1$, $b^2$, $b^3$, $b^4$, (where the four road wheels touch the ground) the so-called "wheel-base figure" of the four wheeled vehicle Fig. 1. If the latter on a level road turns around the point $t°$ (a right hand turn of the vehicle) with a certain speed, a centrifugal force $Cf°$ acts on the center of gravity C, in the direction of $t°C$, its component $Cf$ in the direction of the side normal $Cn$ is the side-force acting now on C. The weight of the loaded vehicle represented by $Cf^1$ Fig. 2, and said side-force $Cf$, have the resultant force $Cf^2$, the direction of the latter goes through $b^1$, a point of the wheel-base figure, and, therefore, the side-force $Cf$ is the turn over side-force, the index-hand on the double-acting indicator D has reached one of the two danger marks on the dial (100s side-force the turn over side-force is shown). If, because of a lower vehicle speed, the side-force acting on C would be only one half of $Cf$, then the continuation of the resultant force would go through point $b^{10}$, and $b°b^{10}$ would be 1/2 of $b°b^1$ (as is easy to see); the index-hand of indicator D would show 50s (that is 50/100 or 1/2 of the turn over side-force) on a side-force scale, the angle $b°Cb^{10}$ is the so-called "side-force angle," and the angle $b°Cb^1$ the so-called "turn over angle," the tangent of the former is 1/2 of the tangent of the latter, and, therefore, the side-force increases in the same proportion as the tangent of the side-force angle increases. A small load (or no load) of the vehicle may bring the center of gravity of the latter to $C°$ Fig. 2, $C°f^4$ representing now the weight of the vehicle; if by a left hand turn of the latter, the side-force $C°f^3$ acts on $C°$, the resultant force of $C°f^3$ and $C°f^4$ is $C°f^5$, its direction (or continuation) goes through $b^{11}$, and if $b°b^{11}$ is 3/5 (that is 60%) of $b°b^2$, then the index-hand of indicator D shows on its dial a side-force of 60s on its side-force scale, the correspondnig side-force angle is $b^{11}C°b^9$ and the turn over angle is now $b^2C°b^9$, the tangent of the latter is $b^2b^9/C°b^9$.

Figures 3, 4:
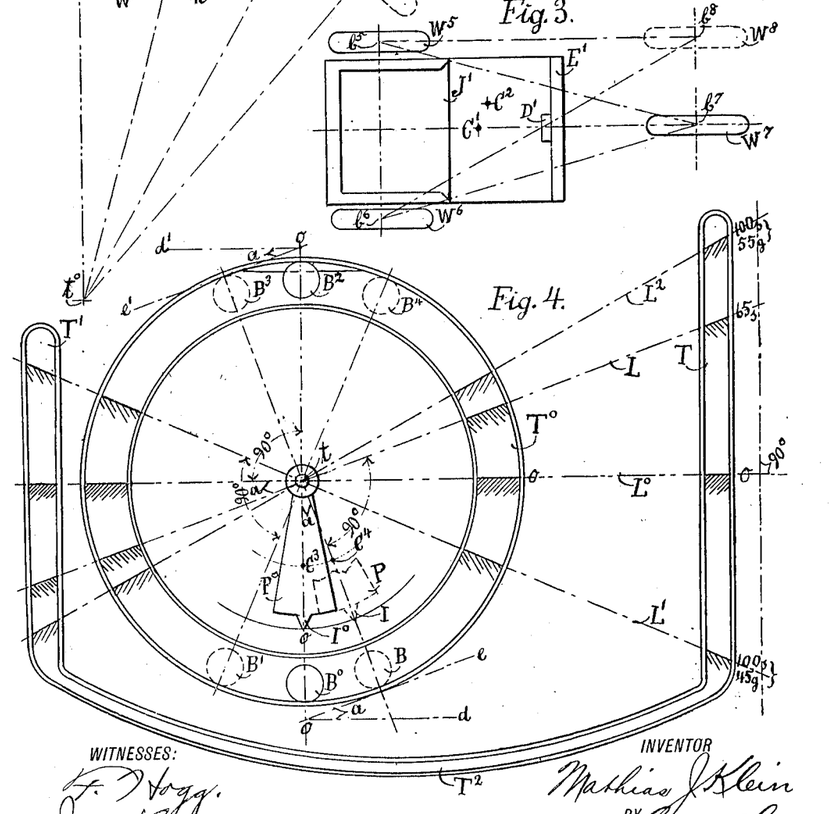

In the three wheeled vehicle Fig. 3, (with the wheel-base figure $b^5b^6b^7$), $W^5$ $W^6$ are the driving wheels, $W^7$ is the steering road wheel, $J^1$ is the seat for the vehicle driver and $C^1$ the center of gravity of the vehicle. (The hand steering wheel or lever and motor are not shown). The double acting side-force and danger indicator $D^1$ on the dash-board $E^1$ will show the side-force (when the vehicle is moving in a curve) only nearly correctly, somewhat too high, for large curve radii, and somewhat too low for small curve radii (sharp turns).

The steering road wheel $W^7$ may have the position $W^3$ Fig. 3, and the wheel base figure would then be $b^5b^6b^8$, and the center of gravity of the vehicle at $C^2$; the double acting indicator $D^1$ would have to be shifted somewhat to the left. Now the side-force would be shown correctly by a vehicle turn to the right, but by a left-hand vehicle turn, the side-force would be shown, only nearly correct by said double acting indicator $D^1$.

In Fig. 4, the circular curved glass tube $T°$ with center at $t$ is nearly filled up with a liquid; the two balls $B°$ and $B^2$ are rolling or oscillating in said glass tube around center $t$. $B°$ is specifically heavier and $B^2$ specifically lighter than said liquid; the pendulum $P°$ with index-hand $I°$ and center of gravity at $C^3$ also oscillates around $t$. The two parallel glass tubes $T$ and $T^1$ (the latter somewhat larger in size than the former) are closed at their upper ends and connected at their lower ends by a thin glass tube $T^2$; they are filled with a liquid up to the horizontal level $tL°$, the air above said liquid level in the glass tubes $T$ and $T^1$ is removed; instrument $T$, $T^1$ and $T^2$ is placed in such a position, that its oscillating liquid level oscillates also around the axis at $t$. If the whole arrangement shown in Fig. 4 (of which base plates and other details are not shown) would be placed on the dashboard of a four wheeled automobile (standing on a level road), the ball $B°$ would have its lowest, and ball $B^2$ its highest position in glass tube $T°$, the horizontal liquid level $tL°$ in glass tubes $T$, $T^1$ would be normal to $B°C^3tB^2$. The vertical line $B°tB^2$ with its zero-points, is the "zero-line" of the oscillating ball in tube form and the horizontal line $tL°$ with its zero-point $o$, is the zero line of the oscillating liquid in tube form of indicator. If said automobile would take a turn to the left, and the resultant force acting on the Fig. 4 arrangement would now have the direction $tB$, then the ball $B°$ would move to the position $B$, and ball $B^2$ to position $B^3$, the pendulum $P°$ would take the position $P$ with its center of gravity at $C^4$ in line $BtB^3$, and the liquid level $tL°$ in glass tubes $T$, $T^1$, would change to the level $tL$, normal to $BC^4tB^3$, and parallel to the tangents $oe$ and $oe^1$ on glass tube $T°$, in the points where the balls $B$ and $B^3$ touch the tube $T°$. The pendulum angle $C^3tC^4=a$ is the side-force angle; it is equal to angle $B°tB$, or angle $B^2tB^3$, or angle $doe$ (the side-force angle for the oscillating ball in tube), or angle $d^1oe^1$ or angle $L°tL$ (the side-force angle for the oscillating liquid in tube), ($do$ and $d^1o$ are horizontal lines); the same is the case when turn over angle is reached, $L°tL^2$ for a left hand turn, and $L^1tL°$ or $B^1tB°$, or $B^4tB^2$ for a right hand turn of the vehicle; the tubes $T$ and $T^1$ may be curved circular (like tube $T°$) instead of straight, and the angles of said liquid levels would change in the same way; therefore, all the double acting indicators using an oscillating pendulum, or an oscillating ball, or an oscillating liquid, are equivalent. No scales are shown in the arrangements of Fig. 4.

Figure 5:
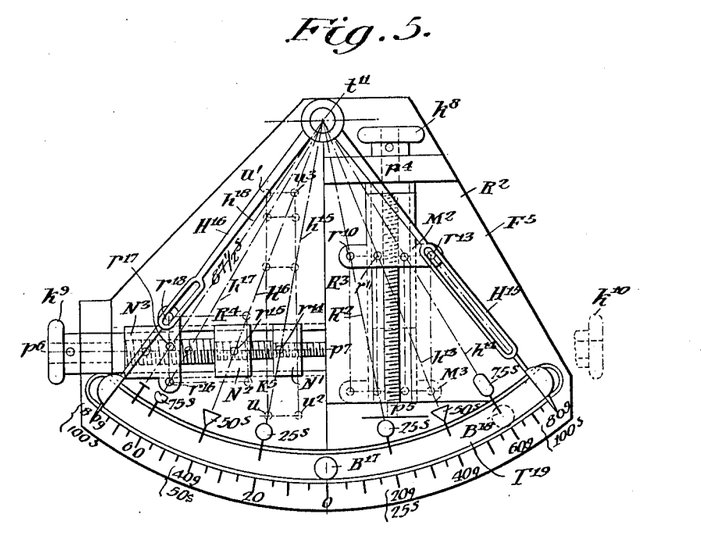
Fig. 5 shows in front view the general arrangement of the double acting indicator with a pair of variable side-force scales, a ball oscillating in a circular curved glass tube is used, and the latter is closed at both ends and nearly filled up with a liquid specifically lighter than the ball.
Figure 6:
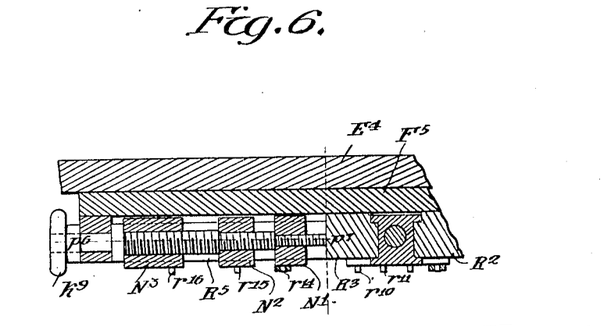
Fig. 6 is a horizontal section of Fig. 5.

In the general arrangement of the indicator shown in Figs. 5 and 6, the circular curved glass tube $T^{19}$ with center at $t^{11}$, and rolling ball $B^{17}$ is connected to base plate $F^5$. The latter has on its dial a pair of grade scales and a pair of variable side-force scales, the latter having the scale hands $h^{12}$, $h^{13}$, $h^{14}$, $h^{15}$, and $h^{15}$, $h^{16}$, $h^{17}$, $H^{16}$, all turning around center $t^{11}$, ball $B^{17}$ acts as index-hand on all said scales. Said indicator is connected to the dashboard $E^4$ of a vehicle. By turning the hand button $k^8$ connected to the screw shaft $p^4$, $p^5$ (which is parallel to the vertical zero line $ot^{11}$), the bar $M^2$ (guided by $R^2$ and $R^3$) with the four pins $r^{10}$, $r^{11}$, $r^{12}$, $r^{13}$, on its upper side can be moved to the position $M^3$. Said four pins move in slots of the four scale hands (like $H^{15}$), and thereby, the latter are moved in such a way, that each scale hand shows always the same side-force for left hand vehicle turns when ball $B^{17}$ reaches it; the line $r^{10}$ $r^{13}$ is normal to the vertical zero line $Ot^{11}$, and as 25s is 1/2 of 50s, 1/3 of 75s and 1/4 of 100s, the distance $r^{10}$ from zero line $Ot^{11}$, is equal to $r^{10}$ $r^{11}$, or $r^{11}$ $r^{12}$, or $r^{12}$ $r^{13}$. For right hand turns of the vehicle, the same construction (not shown) is used on the left side of zero line $Ot^{11}$. On said left side of $Ot^{11}$, is shown another construction of a variable side-force scale. By turning the hand button $k^9$ on screw shaft $p^6$ $p^7$, (the latter is normal to zero line $Ot^{11}$), the three parts $N^1$, $N^2$, $N^3$, (guided by $R^4$ and $R^5$), are moved normally to zero line $Ot^{11}$. On the upper sides of said parts are the pins $r^{14}$ (on $N^1$), $r^{15}$ (on $N^2$), $r^{16}$, $r^{17}$, $r^{18}$ (on $N^3$). They move in slots of the five scale hands $h^{15}$, $h^{16}$, $h^{17}$, $h^{18}$, $H^{16}$ (only the slot on $H^{16}$ is shown), and thereby, the latter are always moved correctly for right hand vehicle turns. The same construction would be used on the right of $Ot^{11}$ for left hand turns of the vehicle; $k^{10}$ would be the hand button. The screw shaft $p^6$ $p^7$ has three screws of different pitch. The pitch of the screw moving $N^2$ is less than half of the pitch of screw moving $N^3$ and double the pitch of screw moving $N^1$. The five scale hands $h^{15}$ to $H^{16}$ show the side-forces 25s, 50s, 75s, 87 1/2s and 100s, respectively. The danger-hands $H^{15}$ and $H^{16}$ may be moved from 80g to 40g of the grade scale. If the three scale hands $h^{17}$, $h^{18}$, $H^{16}$, were moved by three different screws (like the hands $h^{15}$, $h^{16}$), then the screw shaft $p^6$, $p^7$ would have to be increased in length considerably, or else, danger-hand $H^{16}$ could change only from 80g to 65 or 60g of the grade scale. On the left of $Ot^{11}$ is shown (partly only) another construction of a variable side-force scale. If in line $u$, $u^1$, a straight bar with four pins for the four scale hands $h^{15}$, $h^{16}$, $h^{17}$, $H^{16}$, (the latter all having slots like $H^{16}$), were moved by means of a hand screw shaft normal to zero line $Ot^{11}$, from the position $u$, $u^1$ to the position $u^2$ $u^3$, then the danger hand $H^{16}$ would also change from 80g to 40g of the grade scale.

The three double acting side-force and danger indicators shown in Figs. 7 to 12, (which are modifications of the general arrangement shown in Figs. 5 and 6), each use an oscillating or rolling ball in a curved glass tube, closed at the ends and nearly filled up with a liquid specifically lighter than the ball. The circular curved glass tube $T^3$, Fig. 7, with center $t^1$ and rolling ball $B^5$ is connected to the base plate F, the latter is provided with the scale-pair $S^\circ$ (for right hand turns), and S (for left hand turns of the vehicle) said scales are non-variable grade scales (as used on gradometers), the angle O, $t^1$, 100g is therefore 45° (or 1/2 of a right angle); said indicator is provided with the shifting danger-marks or danger-hands $H^\circ$ and H (turning around $t^1$) which both point to 140g of said scale. By loosening and tightening the hand screw $k$, they may be shifted by hand to different places of said grade scale-pair according to turn over angle (or load) of the vehicle; to 140g of the grade scale, belongs the turn over angle O, $t^1$, 140g, its tangent is 1.40; if for another load of the vehicle, the tangent of the turn over angle is 0.80 (for right and left hand vehicle turns), then the danger hands $H^\circ$ and H have to be shifted each to 80g of said grade scale-pair; if now by a left hand vehicle turn the ball $B^5$, which acts as an index-hand on the scale-pair $S^\circ$, S, would reach the danger-hand $H^1$ at 80g, then the 100s side-force (turn over side-force) would be shown and the vehicle would turn over to the right; said ball at 60g would represent a side-force of 75s (because 60/80=0.75); said ball at 40g would indicate 50s and so on. Said indicator is connected to the dashboard $E^2$ Fig. 8 of a four wheeled motor vehicle, in such a way, that (vehicle standing on a level road) $t^1O$ (the zero line) is vertical, and oscillating axis $t^1t^1$ parallel and a little above the center line of the vehicle.

Figures 7, 8, 9, 10:
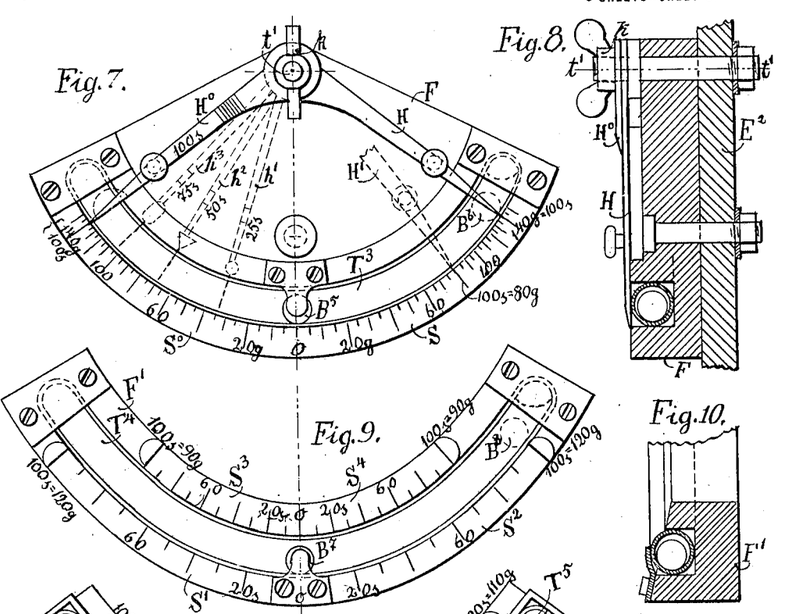

On the left hand side of Fig. 7 is shown in dotted lines a modification of the indicator; the index-hands $h^1$, $h^2$, $h^3$, turning around $t^1$, are the so-called "scale hands" of a variable side-force scale. They can be shifted and set by hand like danger-hand $H^\circ$; the four hands $h^1$, $h^2$, $h^3$, $H^\circ$ make up a complete variable side-force scale for right hand vehicle turns; $h^1$ shows always the 25s, $h^2$ the 50s, $h^3$ the 75s and $H^\circ$ the 100s side-force, when ball $B^5$ reaches them. The $h^1$ (25s) scale hand must show on said grade-scale always 25/100, that is, 1/4 of the grade shown by $H^\circ$, the $h^2$ (50s) hand must show 50/100 or 1/2 of the grade shown by $H^\circ$, and so on; as $H^\circ$ points to 140g, $h^3$ points to 75/100 or 3/4 of 140, that is to 105g, $h^2$ to 70g and $h^1$ to 35g. Instead of the four divisions, 25s, 50s, 75s, 100s, said variable side-force scale may have any other number of divisions, for instance, three (33 1/3s, 66 2/3s, 100s). On the right hand side of Fig. 5 (not shown) is the same variable side-force scale for left hand vehicle turns. The scale divisions, on the scale-pair $S^\circ$, S, (from zero up to the danger marks 100s), decrease in size. If in Fig. 5, the screw shaft $p^4$ $p^5$ with bar $M^2$ and its pins $r^{10}$, $r^{11}$, $r^{12}$, $r^{13}$, are left away, the modification shown in Fig. 7 on the left of $Ot^1$, is produced; and if also, the danger hands $h^{12}$, $h^{13}$, $h^{14}$, of Fig. 5, or the danger hands $h^1$, $h^2$, $h^3$, of Fig. 7 are left away, the modification shown in Fig. 7 on the right of $Ot^1$, is produced; and by omitting also the grade scales of Fig. 5 or Fig. 7, a modification of the indicator, having no scales, is produced, as shown in Fig. 4.

The elliptic curved glass tube $T^4$ of the double acting indicator shown in Figs. 9 and 10, with rolling ball $B^7$ is connected to base plate $F^1$, the latter has two scale-pairs $S^1$, $S^2$ and $S^3$, $S^4$ on the dial, (one pair for the loaded and one pair of the unloaded vehicle), on which scales the side-force, acting on the vehicle is shown on side-force scales (ball $B^7$ acting as index-hand on said scales.) Two danger-marks are acting or working when the vehicle is loaded, and two other danger-marks are acting, when the vehicle is unloaded. The tangent of the turn over angle is 0.90 for the loaded and 1.20 for the unloaded vehicle for right and left hand vehicle turns; the scale divisions on said side-force scales are nearly constant, when the small axis is about 1/2 of the large axis of the ellipse, to which form said glass tube $T^4$ is curved. The vertical line $oB^7o$ is the zero line of the indicator and a part of the large axis of said ellipse. Instead of two pairs of side-force scales, more than two, a plurality of pairs of side-force scales could be used on the dial of the indicator, corresponding to a plurality of different vehicle loads, the two 100s marks of each scale pair are the two acting danger-marks, when the corresponding load is carried on the vehicle, the curvature of the glass tube may be a part of a circle, or of an ellipse, or of a parabola, of any other curve.

Figures 11, 12, 13:
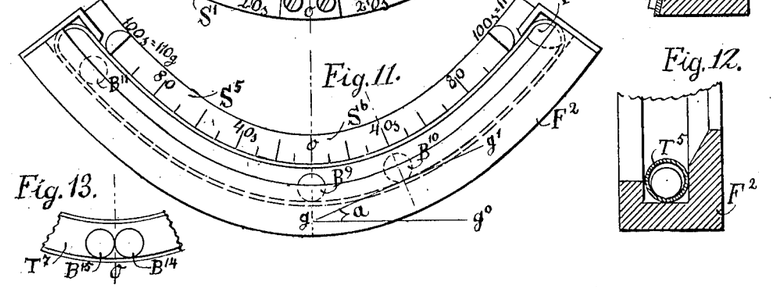

The parabolic curved glass tube $T^5$ of the double acting indicator shown in Figs. 11 and 12 with the oscillating or rolling ball $B^9$, is connected to base plate $F^2$, the latter has the scale-pair $S^5$, $S^6$, on which the rolling ball $B^9$ as index-hand shows the side-force on side-force scales. Here, the tangent of the turn over angle is 1.10 for right and left hand turns of the vehicle. When by a left hand vehicle turn ball $B^9$ reaches the position $B^{10}$, then the side-force angle is always the angle $g°gg^1=a$ ($gg^1$ being a tangent on the glass tube $T^5$ where $B^{10}$ touches the latter, and $g°g$, a horizontal line), whether said glass tube is curved, circular or parabolic, or any other way, and as said ball in position $B^{10}$ indicates on scale $S^6$ the side-force 40s (which is 40/100 or 4/10 of the turn over side-force), the tangent of the side-force angle $a=g°gg^1$ is 4/10 of 1.10 or 0.44. (on a grade scale $B^{10}$ would indicate 44g). The scale divisions on scale-pair $S^5$, $S^6$, are increasing from zero up to the danger-marks. The vertical line $gB^9o$, is the zero-line of the indicator and a part of the axis of the parabola. If the latter is not the case, the scale divisions on the dial would become more or less irregular. The advantage of the parabolic curved glass tube (as compared with the circular curved glass tube), is the increased scale divisions near the danger-marks.

All the indicators shown in the Figs. 7 to 12 may have no scales, like the arrangements shown in Fig. 4, but only the two danger-marks (or danger-hands) with the zero-point O on their dials such a case (no scales on the dial) may be regarded as a modification of variable side-force scales, where the number of scale divisions is reduced to "one" (the 100s, the danger mark) for each scale (instead of 3, or 5, or 8, or any other number).

In the modification shown in Fig. 13, the two balls $B^{14}$ and $B^{15}$, rolling or oscillating in glass-tube $T^7$ are used as an index-hand on the scales of the indicator; said two balls may be substituted for the one ball used in the Figs. 5 to 12 instruments.

All the double acting indicators shown in the Figs. 5 to 12 (connected to the dashboards of automobiles), may be turned 180° around an axis normal to the plane of the curved glass tube, and they will indicate in that position, exactly in the same way as before turning. The ball specifically heavier than the liquid, will stay immovably at one end of the glass tube, and the small quantity of air contained in the tube will now take (in the shape of an "air-bubble") the place of the rolling ball as index-hand, and show on the scales of the indicator, the side-force acting on the turning vehicle. Said air-bubble will not have exactly the shape of a ball, but as air is specifically lighter than the liquid in the tube, said bubble will always take the highest place in the curved glass tube, like a ball specifically lighter than the liquid.

All double acting indicators, having a pair of grade scales on the dial, would also show the "banking grade" of the road (vehicle at rest or moving straight), and also the "grade" of the road, when the vehicle is set at right angles to the road direction. Said indicators could also be used on vehicles (cars) moving on tracks, and also on horse drawn vehicles; in the latter case, the indicator would show the side force only nearly correct, because an outside force acts also on the vehicle. The same is the case, when some wind power acts sidewise on the vehicle.

I have described one embodiment of my invention, but it is clear that changes may be made therein without departing from the spirit of the same as defined in the appended claims.

I claim:

1. In a double-acting side-force and danger indicator for vehicles, in combination with a vehicle a base-plate, a curved glass tube with a ball oscillating in it on said base-plate, said glass tube being closed at the ends and nearly filled up with a liquid specifically lighter than said ball, a dial on said base plate having a zero line, two danger-hands, a zero line (one on each side of the zero-line), the positions of said danger-hands on said dial having a fixed relation to the position of the center of gravity to the loaded vehicle, said curved glass tube with its zero-line being disposed in a perpendicular plane relative to the longitudinal axis of the vehicle, said oscillating ball in said curved glass tube acting as an index-hand on said dial, and showing thereby on the latter, when the vehicle is moving in a curve on a level or banked road, the increased danger of the vehicle being turned over, when said oscillating ball comes more or less close to one of said two danger-hands.

2. In a double acting side-force and danger indicator for vehicles, in combination with a vehicle a base-plate, a curved glass tube with a ball oscillating in it on said base-plate, said glass tube being closed at the ends and nearly filled up with a liquid specifically lighter than said ball, a dial on said base-plate having two danger-hands, a zero line and a pair of non-variable scales (one on each side of the zero-line), the positions of said danger-hands on said dial having a fixed relation to the position of the center of gravity of the loaded vehicle, said curved glass tube with its zero-line being disposed in a perpendicular plane relative to the longitudinal axis of the vehicle, said oscillating ball acting as an index-hand on said pair of scales, and showing thereby on the latter, when the vehicle is moving in a curve on a level or banked road, indirectly the side force acting on the vehicle, and the increased danger of the latter being turned over, when said oscillating ball comes more or less close to one of said two danger-hands.

3. In a double acting side-force and danger indicator for vehicles, in combination with a vehicle a base-plate, a curved glass tube with a ball oscillating in it on said base-plate, said glass tube being closed at the ends and nearly filled up with a liquid specifically lighter than said ball, a dial on said base plate having a zero line, two danger-marks and a pair of side-force scales (one on each side of the zero-line), the positions of said danger-marks on said dial having a fixed relation to the position of the center of gravity of the loaded vehicle, said curved glass tube with its zero-line being disposed in a perpendicular plane relative to the longitudinal axis of the vehicle, said oscillating ball acting as an index-hand on said pair of side-force scales, and showing thereby on the latter, when the vehicle is moving in a curve on a level or banked road, the side-force acting on the vehicle, and the increased danger of the latter being turned over, when said oscillating ball comes more or less close to one of said two danger-marks.

4. In a double acting side-force and danger indicator for vehicles, in combination with a vehicle a base-plate, a circular curved glass tube with a ball oscillating in it on said base-plate, said glass tube being closed at the ends and nearly filed up with a liquid specifically lighter than the ball, a dial on said base-plate having a zero line, two adjustable danger-hands (one on the right and one on the left hand side of the zero-line) and two pairs of scales, one being a non-variable pair of grade-scales and the other a variable pair of side-force scales, each scale of the latter consisting of a certain number of scale-hands turning around the center of the circular curved glass tube, each scale-hand is (by means of said non-variable pair of grade scales) set by hand according to vehicle load, the positions of said danger-hands on said dial having a fixed relation to the position of the center of gravity of the loaded vehicle, said curved glass tube with its zero-line being disposed in a plane perpendicular to the longitudinal axis of the vehicle, said oscillating ball acting as an index-hand on said variable pair of side-force scales, and showing thereby on the latter, when the vehicle is moving in a curve on a level or banked road, the side-force acting on the vehicle, and the increased danger of the latter being turned over, when said oscillating ball comes more or less close to one of said two danger-hands.

5. In a double acting side-force and danger indicator for vehicles, in combination with a vehicle a base plate, a circular curved glass tube with a ball oscillating in it on said base plate, said glass tube being closed at the ends and nearly filled up with a liquid specifically lighter than the ball, a dial on said base-plate having a zero line two adjustable danger-hands (one on the right and one on the left hand side of the zero-line) and two pairs of scales, one being a non-variable pair of grade-scales and the other a variable pair of side-force scales, each scale of the latter consisting of a certain number of scale-hands turning around the center of the circular curved glass tube, each of said scale-hands having a radial slot in which a pin moves, all pins (connected to a bar) being in a straight line normal to the zero-line of the indicator, the distance of each pin from said zero-line being in proportion to the side-force which the corresponding scale-hand indicates, all scale-hands are set by means of two hand screws (one on each side of the zero-line, their axis being parallel with the latter), one hand screw moves one half of all the scale-hands (by means of said non-variable pair of grade scales) to their proper places according to the load of the vehicle for right hand vehicle turns, and the other hand screw moves the rest of the scale hands in the same way for left hand vehicle turns, so that each of said scale-hands shows always the same side-force when said oscillating ball (acting as index-hand) reaches it, the positions of said danger-hands on said dial having a fixed relation to the position of the center of gravity of the loaded vehicle, said curved glass tube with its zero-line disposed in a perpendicular plane relative to the longitudinal axis of the vehicle, said oscillating ball as index-hand showing thereby on said variable side-force scales, when the vehicle is moving in a curve on a level or banked road, the side-force acting on the vehicle, and the increased danger of the latter being turned over, when said oscillating ball comes more or less close to one of said two danger-hands.

6. In a double acting side-force and danger indicator for vehicles, in combination with a vehicle a base-plate, a curved glass tube with a ball oscillating in it on said base-plate, said glass tube being closed at the ends and nearly filled up with a liquid specifically lighter than the ball, a dial on said base-plate having a plurality of pairs of side-force scales, corresponding to a plurality of different loads of the vehicle, the two 100s marks of each scale pair are the two acting danger-marks for the corresponding vehicle load, the positions of the two acting danger-marks on the dial have a fixed relation to the position of the center of gravity of the vehicle with the corresponding load, said curved glass tube with its zero-line being disposed in a perpendicular plane relative to the longitudinal axis of the vehicle, said oscillating ball, acting as an index-hand on said acting side-force scales, and showing thereby on the latter, when the vehicle is moving in a curve on a level or banked road, the side-force acting on the vehicle, and the increased danger of the latter being turned over, when said oscillating ball comes more or less close to one of said two acting danger-marks.

7. In a double acting side-force and danger indicator for vehicles, in combination with a vehicle a base-plate, a circular curved glass tube with a ball oscillating in it on said base-plate, said glass tube being closed at the ends and nearly filled up with a liquid specifically lighter than the ball, a dial on said base-plate having a zero line, two adjustable danger-hands (one on the right and one on the left hand side of the zero-line) and two pairs of scales, one being a non-variable pair of grade scales and the other a variable pair of side-force scales, each scale of the latter consisting of a certain number of scale-hands turning around the center of the circular curved glass tube, each of said scale-hands having a radial slot in which a pin moves, all pins (connected to a bar) being in a straight line parallel to the zero-line of the indicator, all the scale-hands being set by means of two hand screws (one on each side of the zero-line, their axis being normal to the latter), one hand screw moving one-half of all the scale-hands by means of said non-variable pair of grade scales to their proper places according to the load of the vehicle for right hand vehicle turns, and the other hand screw moving the rest of the scale hands in the same way for left hand vehicle turns, so that each of said scale-hands shows always the same side-force when said oscillating ball (acting as index-hand) reaches it, the positions of said danger-hands on said dial having a fixed relation to the position of the center of gravity of the loaded vehicle, said curved glass tube with its zero-line being disposed in a perpendicular plane relative to the longitudinal axis of the vehicle, said oscillating ball as index-hand showing thereby on said variable side-force scales when the vehicle is moving in a curve on a level or banked road; the side-force acting on the vehicle, and the increased danger of the latter being turned over, when said oscillating ball comes more or less close to one of said two danger-hands.

8. In a double acting side-force and danger indicator for vehicles, in combination with a vehicle, a base plate, a dial on said base plate having two danger marks and a zero line, a curved glass tube having a body oscillating therein on the base plate, and a pair of side-force scales, one on each side of the zero line, said curved glass tube and the dial being disposed in a plane perpendicular to the longitudinal axis of the vehicle, said oscillating body acting as an index hand on said pair of side-force scales and showing thereby on the latter, when the vehicle is moving in a curve, the side-force acting on the vehicle and the increased danger of the latter being turned over when said oscillating body comes more or less close to one of said two danger marks.

In testimony, that I claim the foregoing as my invention, I have signed my name in presence of two subscribing witnesses.

MATHIAS J. KLEIN.

Witnesses:
F. HOGG,
H. GOEPEL.

Copies of this patent may be obtained for five cents each, by addressing the "Commissioner of Patents, Washington, D. C."